C. V. HILL.

HEATER FOR BROODERS.

APPLICATION FILED DEC. 30, 1916.

Reissued Oct. 30, 1917.

14,386

2 SHEETS—SHEET 1.

Witness

G. V. Baker

S. Wilson

Inventor

Clement V. Hill

By Edwin S. Clarkson his Attorney

C. V. HILL.

HEATER FOR BROODERS.

APPLICATION FILED DEC. 30, 1916.

Reissued Oct. 30, 1917.

14,386.

2 SHEETS—SHEET 2.

Inventor

Clement V. Hill

Witnesses

G. F. Baltz

S. Wilson

By Edwin S. Clarkson his Attorney

UNITED STATES PATENT OFFICE.

CLEMENT V. HILL, OF TRENTON, NEW JERSEY

HEATER FOR BROODERS.

14,386. Specification of Reissued Letters Patent. Reissued Oct. 30, 1917.

Original No. 1,152,732, dated September 7, 1915, Serial No. 878,093, filed December 19, 1914. Application for reissue filed December 30, 1916. Serial No. 139,754.

*To all whom it may concern:*

Be it known that I, CLEMENT V. HILL, a citizen of the United States of America, residing at Trenton, in the county of Mercer and State of New Jersey, have invented certain new and useful Improvements in Heaters for Brooders, of which the following is a specification.

In the use of a coal stove for heating brooders one of the greatest problems is to prevent the escape of coal gas into the room in which the brooder is located. This is especially true in connection with self feeder or magazine stoves. It is desirable to use a magazine stove in brooders so as to reduce to a minimum the liability of the fire burning out.

One of the objects of my invention is to provide a brooder heater stove in which there is a gas chamber between the top of the magazine and the top of the stove and to provide means whereby said chamber is always in communication with the stove pipe, without affecting the draft of the stove, said gas chamber being separated from the direct smoke passage in the stove.

Another object of my invention is to provide an automatic regulator for the stove.

A still further object of my invention is to so construct the stove, regulator, and associated parts in such manner that the brooder hood is free to be raised and lowered without disturbing the parts of the stove and regulator; and with these and other objects in view my invention consists of the parts and combination of parts as will be hereinafter set forth.

In the drawings: Figure 1 is a central vertical section of a brooder embodying my invention.

Figure 1:
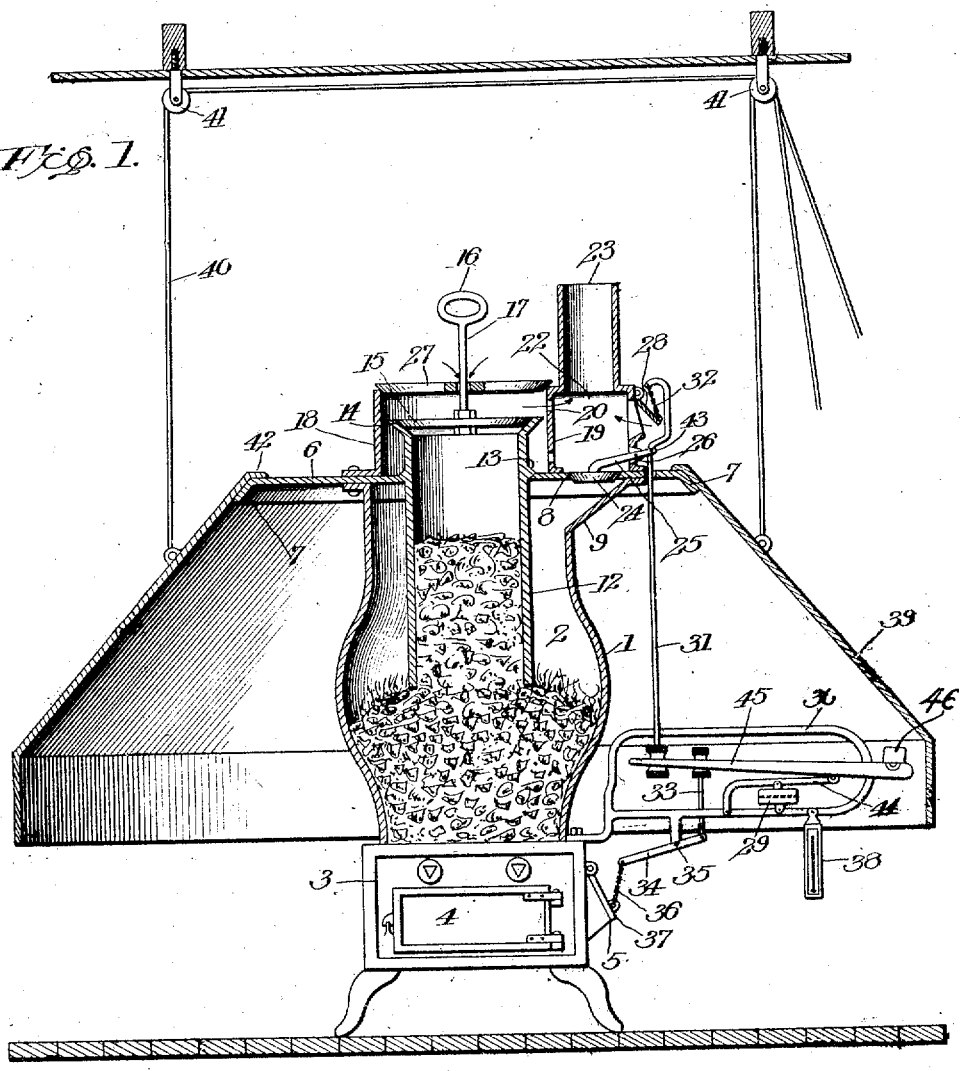
Figure 2:
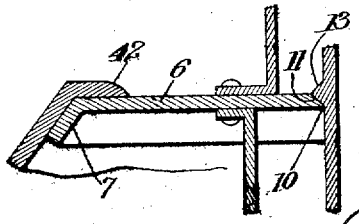
Fig. 2 is an enlarged detail sectional view showing the joint between the stove and magazine and between the stove top and hood.

The reference numeral 1 designates a stove body having its greatest diameter substantially midway of its height, the fire pot portion of which is below the greatest diameter and the combustion chamber above the greatest diameter of the stove body, having a fire box 2, an ash chamber 3, and ash door 4. The ash chamber is also provided with a draft opening having a door 5.

The top plate 6 of the stove has a peripheral flange 7 inclined downwardly at an angle less than a right angle to provide a bearing surface for the hood as will be hereinafter explained. A smoke hole or draft opening 8 is provided in the top plate 6, the stove wall being deflected as at 9 under said smoke hole. In the center of the top plate 6 and central with the axis of the stove an opening 10 is formed, the walls of which are beveled as at 11 in which the magazine is suspended.

The magazine 12 extends in to the fire box 2 the proper distance and is held in position by means of an annular beveled flange 13 engaging the beveled wall of the opening 10 in the top plate, the two bevels being formed on the same angle so that they fit with a practically gas tight joint. The top of the magazine terminates in a flared collar or flange 14, the angle of flare being the same as the angle of bevel of the wall of the opening 10 in the top plate 6. A valve 15 having a beveled periphery is adapted to fit in said collar 14 of the magazine with practically a gas tight joint. Now if for any reason it is desired to dispense with the magazine, it may readily be withdrawn from the stove and the valve 15 used to close the opening 10 in the plate 6. The valve 15 is provided with an operating handle 16 having an elongated stem 17.

On the top of the plate 6 I secure a member 18. This member 18 is provided with base flanges by means of which it is secured by bolts to the top plate 6. This member 18 is also provided with a partition 19 having ports 20, said partition dividing the gas chamber 21 from the smoke passage of chamber 22, the ports 20 providing exits for gas from the chamber 21 into the chamber 22, the chamber 22 being at all times open to the stove pipe 23. The bottom of the smoke chamber 22 is provided with an opening establishing communication between said chamber and the fire box; the walls of this opening are beveled as shown in the drawing. A check damper 24 having a beveled periphery is adapted to close this opening in the bottom of the smoke chamber to stop the draft, said damper being carried by an arm 25 pivotally mounted as at 26, the outer end of the arm projecting outside the smoke chamber. Now when the damper 24 is in closed position the pressure of gas in the stove is sometimes sufficient to cause it to leak around the periphery of the damper and the valve 15. From the smoke chamber 22 the gas will immediately escape to the stove pipe, but that leaking around the valve 15 would escape into the room and kill the chicks in the brooder. In order to prevent this I provide a lid 27 to cover the top of the gas chamber 21 said lid having a central opening through which the stem 17 of the handle 16 passes, said opening being of greater diameter than the stem whereby a space is left around the stem through which air is drawn by the natural draft of the stove pipe carrying the gas with it from the chamber 21, through ports 20 into the smoke chamber and thence into the smoke stack as indicated by the arrows. This draft is augmented by the fact that the door 28 of the smoke chamber is open when the damper 24 is closed. This same draft of the stove pipe will naturally draw all the gas from the smoke chamber. In order to automatically control the damper and thus regulate the heat of the brooder I provide any suitable commercial thermostat 29 and mount it in a suitable frame 30 attached to the base of the stove. I prefer to mount the thermostat in a frame to prevent the chicks from roosting on it. A rod 31 is operatively connected to the thermostat at the bottom and at the top is provided with a chain 32 the lower end of which is attached to the door 28 of the smoke chamber and constitutes a flexible connection between said rod and door thus permitting the door to swing in an arc on its hinges without affecting the vertical movement of the rod. A rod 33 is also connected to the thermostat and passes through the bottom of the frame 30, its lower end being pivotally secured to a lever 34 which is pivotally mounted on the lug 35 on the bottom of the frame. A chain 36 is connected to the opposite end of the lever 34 and to the air door 37 of the ash pit or chamber thereby establishing a flexible connection between said door and lever.

38 is a thermometer suspended from the frame 30 near the floor, as it is at this point that the temperature of the room must be carefully regulated because the chicks are on the floor.

A hood 39, open at the top and bottom, is suspended from the stove top 6, and may be elevated, when necessary, by means of ropes 40 and running over the pulleys 41 secured to the ceiling of the room. The upper part of the hood is inclined on the same angle as the flange 7 thereby forming a tight joint therewith while the upper edge or marginal portion of the hood is bent inwardly to constitute a flange 42 which rests on the upper face of the top plate 6 as shown.

The diameter of the opening in the top of the hood is such that will clear all working parts of the stove and regulator, whereby it may be raised and lowered without disturbing any connection between the working parts of the organization.

It is obvious from the above description that if the temperature near the floor falls below a predetermined degree the thermostat will automatically pull the rod 31 downward, thereby closing the door 28 of the smoke chamber, and by reason of the pivotal connection 43 between the outer end of the arm 25 and rod 31, open the damper 24 and simultaneously, through the rod 33, lever 34, and chain 36, open the air door 37 in the ash pit or chamber thus admitting air to the fire box and permitting the fire to start up. When the predetermined high degree of temperature is attained the thermostat will be again operated and restore the parts to the positions indicated in Fig. 1.

It will also be seen that chambers are provided above the top of the magazine 12 and above the stove damper 24, both of which are at all times in communication with the stove pipe 23 thus insuring the passage of all gases escaping from the stove directly into the smoke pipe thereby eliminating the escape of the gases in the room. This is very important as coal gas will surely kill the chicks.

As shown in the drawing an arm 44 is pivotally mounted on the frame and connected with the thermostat, and a lever 45 is pivotally mounted on said arm, the rods 31 and 33 being connected to said lever. 46 is a counterbalance mounted on the lever 45.

Figure 3:
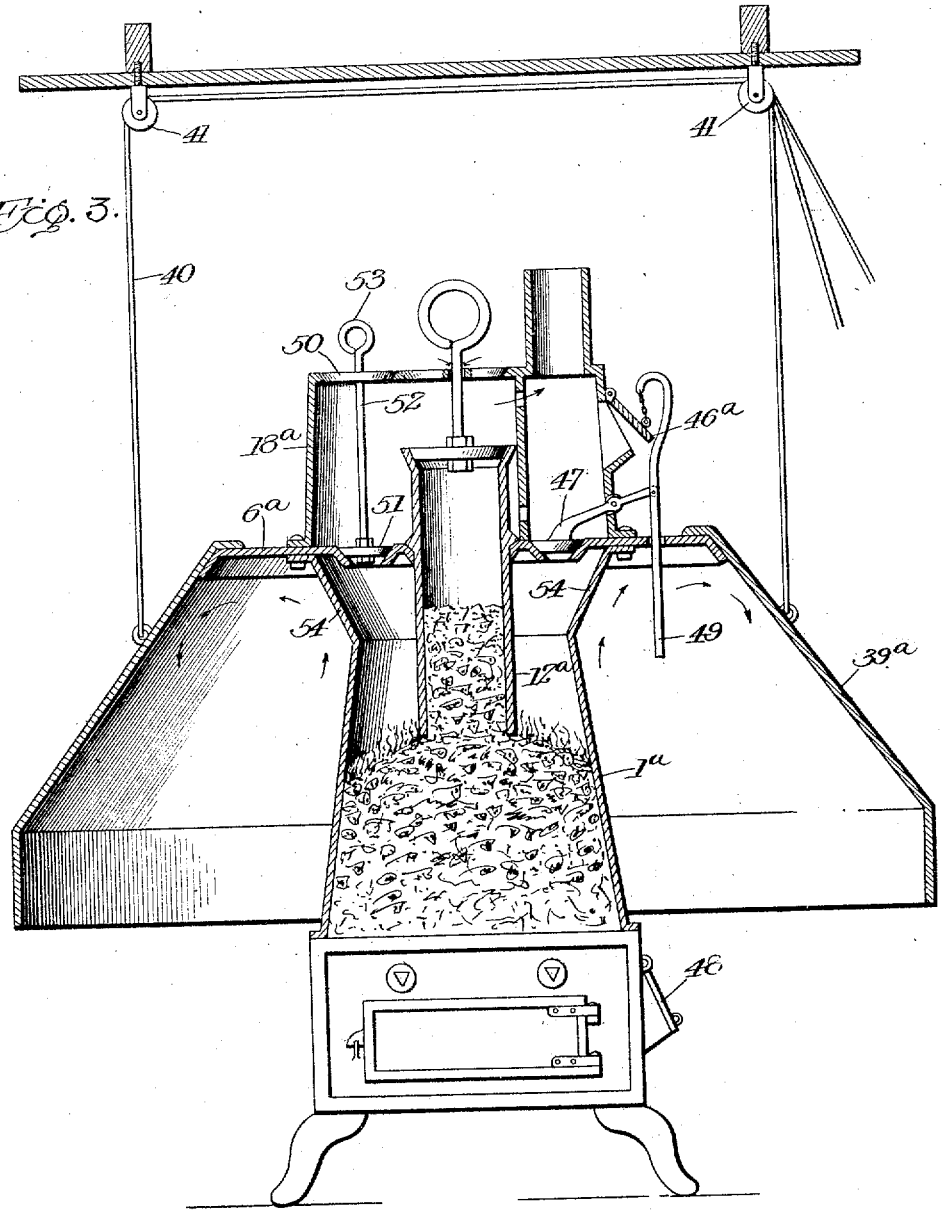
Fig. 3 is a vertical sectional view of another embodiment of my invention.

In Fig. 3 the damper 47, air door 46ª, and ash door 48 are substantially of the same construction shown in Fig. 1 and they are connected to the thermostat rod 49 as shown in Fig. 1. I provide in this construction a peep hole to enable the operator to ascertain the condition of the fire at any time without raising the hood and without disturbing any of the operating parts, but make this opening of a very small diameter to reduce to a minimum the liability of the escape of gas. The peep opening is made by forming a hole in the top wall of the chamber 18ª and an opening in the top plate 6ª of the stove in alinement with each other. These openings are closed by means of lids 50 and 51 rigidly mounted on and carried by the rod 52, the upper end of which terminates in a suitable handle 53, whereby the lids may be removed to enable the operator to look down upon the fire between the magazine feeder 12ª and side of the stove. The hood 39ª is of the same construction as heretofore described, while the body of the stove 1ª is of different construction in that at the top the walls are flared out, as at 54; said flare constituting a baffle surface for the heat radiating from the sides of the stove. The ascending heat strikes this baffle and is deflected against the downwardly inclined sides of the hood 39ª whereby the heat is deflected toward the floor. The coöperation of the flare 54 and hood 39ª creates a circulation of heated air under the hood and prevents the formation of a dead pocket of air at the top of the hood. This flared upper end of the stove body enables me to conveniently locate the peep hole between it and the magazines.

What I claim is:

1. In a brooder heater the combination with a base portion, of a stove body having its greatest diameter substantially midway of its height, the fire pot portion of which is below and the combustion chamber above the greatest diameter of the stove body, the top of the stove being provided with draft and fuel openings, a damper in the draft opening, a thermostat connected to said base, means connecting the thermostat with the said damper, and a canopy supported at the upper part of the combustion chamber and centrally apertured so that the draft and fuel openings are located outside of the canopy.

2. In a brooder heater, the combination with a base portion, a stove body having its greatest diameter near the center, the top of the heater being formed with draft and fuel openings, a damper in the draft openings, a thermostatic device projecting from the base portion, a vertical damper rod connected thereto, means connecting said damper and said rod, and a canopy supported at the upper part of the stove body and centrally apertured so that the draft and fuel openings are located outside of the canopy.

3. In a brooder heater, the combination of a base portion, a stove body having its widest part near the center, draft and fuel openings in the top of the heater, a thermostatic device projecting from the base portion, a vertical connecting rod extending upwardly therefrom, a check damper in said draft opening, and means connecting check damper and said rod, and a canopy supported at the upper part of the stove body and centrally apertured so that the draft and fuel openings are located outside of the canopy.

4. In a brooder heater the combination of a base, an upper section above the base having its widest part near its center, and having its sides converge upwardly, a top plate, a thermostatic arm projecting horizontally from the base, a vertical connecting rod extending upwardly from said thermostatic arm, check draft and fuel openings located in said top, a check damper in said check draft opening, and means connecting said check damper to said connecting rod and a canopy supported at the upper part of said upper section and centrally apertured so that the draft and fuel openings are located outside of the canopy.

5. In a brooder heater, the combination with a base portion, a stove body having its greatest diameter near the center thereof, the top of the heater being formed with check draft and fuel openings, a check damper in said check draft opening, a thermostatic device projecting from the base portion, a vertical damper rod connected thereto and connected with said damper, and a canopy supported at the upper part of the stove body and centrally apertured so that the draft and fuel openings are located outside of the canopy; whereby the thermostat is controlled by the temperature near the floor and the check draft and fuel openings are outside the canopy where they are readily accessible and the gases leaking therefrom are not discharged under the canopy.

6. In a brooder heater, the combination with a base portion, a stove body having its greatest diameter at substantially the center thereof, the top of the heater being formed with a check draft opening and a fuel opening, a check damper in said check draft opening, and a cover for said fuel opening, a gas collecting chamber over said check draft and fuel openings, a thermostatic device projecting from the base portion, a vertical damper rod connected thereto and connected with said damper, and a canopy supported at the upper part of the stove body and centrally apertured so that the check draft and fuel openings and gas collecting chamber are located outside of the canopy; whereby the thermostat is controlled by the temperature near the floor, and the check draft and fuel openings and gas collecting chamber are outside of the canopy where they are readily accessible and the gases leaking therefrom are not discharged under the canopy.

7. In a brooder heater, the combination with a stove having a top plate provided with a smoke opening and a fuel opening, a gas collecting chamber positioned on said plate over each of said openings, said chambers being always in open communication with each other and with the smoke discharge flue, and a damper in the smoke opening.

8. In a brooder heater, the combination with a stove having a fuel opening and a smoke opening in its top plate, a valve for the fuel opening and a damper in the smoke opening, a gas collecting chamber over each of said openings, and a smoke discharge flue leading from one of said chambers, said chambers being in constant open communication with each other and with the smoke discharge fuel opening.

9. In a brooder heater, the combination with a stove, having an opening in its top plate, a magazine suspended in the stove through said opening, a valve to close the upper end of the said magazine, a chamber to collect gas escaping from the magazine, a second chamber mounted on the top plate of the stove in constant open communication with the magazine chamber and the smoke discharge flue, said top plate being provided with a smoke opening leading to said second chamber, and a damper in said smoke opening.

10. In a brooder heater, the combination with a stove having a fuel opening and a smoke opening in the top plate, of a magazine suspended through the fuel opening in the stove, a valve for the top of the magazine, a chamber surrounding the top of the magazine and always in communication with the smoke discharge flue, a damper in the smoke opening, a chamber over said damper in smoke opening and always in communication with said flue, an air door for the chamber over the smoke opening and means for closing the said door and opening the damper.

11. In a brooder heater, the combination with a stove having a fuel opening and a smoke opening, a valve for the fuel opening and a damper for the smoke opening, communicating chambers over said openings always in communication with the smoke discharge flue, an air door for one of said chambers, an air door for said stove and means for approximately simultaneously opening one air door and closing the other air door and closing the damper when the chamber air door is open and opening the damper when the chamber air door is closed.

12. In a brooder heater, the combination with a stove having a fuel opening and a smoke opening, a valve for the fuel opening and a damper for the smoke opening, chambers over said openings and always in communication with a smoke discharge flue, an air door for one of said chambers, a rod operatively connected to said air door and said damper, an air door for the stove and a rod operatively connected therewith and means to operate said rods to open one air door and close the other air door, and operate the damper so that the damper will be moved to closed position when the chamber air door is open and moved to open position when the chamber air door is closed.

13. In a brooder heater, the combination with a stove having a fuel and a smoke opening in its top plate, a valve for the fuel opening and a damper for the smoke opening, chambers over said openings and alway in communication with a smoke discharge flue, an air door for one of said chambers, a rod operatively connected to said air door and said damper, an air door for the stove and a rod operatively connected therewith, a lever to which said rods are connected and a thermostat to control the movement of said lever.

In testimony whereof, I have hereunto subscribed my name this 29th day of December, 1916.

CLEMENT V. HILL.

Witnesses:
WILLIAM J. PIERREPONT,
W. VALE.